US006979661B1

(12) United States Patent
Borrelli et al.

(10) Patent No.: US 6,979,661 B1
(45) Date of Patent: Dec. 27, 2005

(54) HIGHLY BIREFRINGENT GLASS

(75) Inventors: Nicholas F. Borrelli, Elmira, NY (US); George B. Hares, Corning, NY (US); Mark L. Powley, Campbell, NY (US); Joseph F. Schroeder, Corning, NY (US)

(73) Assignee: Corning Incorporated, Corning, NY (US)

( * ) Notice: Subject to any disclaimer, the term of this patent is extended or adjusted under 35 U.S.C. 154(b) by 54 days.

(21) Appl. No.: 10/857,070

(22) Filed: May 28, 2004

(51) Int. Cl.[7] ......................... C03C 10/02; C03C 3/118
(52) U.S. Cl. ........................................... 501/10; 501/59
(58) Field of Search .................................... 501/10, 59

(56) References Cited

U.S. PATENT DOCUMENTS 5,375,012 A 12/1994 Borrelli et al. ............. 359/485
5,627,676 A 5/1997 Borrelli et al. ............. 359/494

*Primary Examiner*—Karl Group
(74) *Attorney, Agent, or Firm*—Walter M. Douglas

(57) ABSTRACT

A birefringent glass composed of a phase-separated glass is provided. The phase-separated glass includes a borosilicate glass in which fluorine and a constituent that tends to crystallize into a high refractive index phase as a consequence of phase separation are included. In one embodiment, the constituent comprises $TiO_2$.

9 Claims, 2 Drawing Sheets

HIGHLY BIREFRINGENT GLASS

BACKGROUND OF THE INVENTION

The invention relates to birefringent glasses and their use in making waveplates.

Waveplates, also called linear phase retarders or retardation plates, introduce a phase shift between polarized components of light transmitted through the plate. The birefringent property of the waveplate causes the light to split into an ordinary ray and an extraordinary ray. The two rays travel at different velocities in the plate. The path difference, kλ, expressed in wavelengths, between the two rays is given by:

$$k\lambda = \pm l(n_e - n_o) \tag{1}$$

where $n_e$ is the refractive index of the extraordinary ray, $n_o$ is the refractive index of the ordinary ray, l is the physical thickness of the waveplate, k is the wavelength of the light ray, and k can be considered as the retardation expressed in fractions of a wavelength. The difference in velocities of the rays result in a phase difference, also called plate retardation, when the two rays recombine. The phase difference, δ, between two rays traveling through a birefringent material is 2π/λ times the path difference. That is, $$\delta = \pm\frac{2\pi}{\lambda}l(n_e - n_o) \tag{2}$$

Waveplates are characterized based on the phase difference introduced between the ordinary and extraordinary rays. For a half waveplate, δ=(2m+1)π, i.e., an odd multiple of π. For a quarter waveplate, δ=(2m+1)π/2, i.e., an odd multiple of π/2. For a full waveplate, δ= 2mπ. For the full, half, and quarter waveplates, the order of the waveplate is given by the integer m. When m=0, the term zero order waveplate is used. When m>0, the term multiple order waveplate is used. For waveplate applications requiring high stability, a low order, and ideally zero order, waveplate is preferred. In this respect birefringent glasses, such as disclosed in U.S. Pat. Nos. 5,375,012 and 5,627,676, have an advantage over crystalline materials such as quartz, calcite, and mica. With birefringent glasses, zero order waveplates can be made in an integral body with a practical thickness for finishing and handling, e.g., 0.5 to 1.5 mm thickness in the visible wavelength range. Crystalline materials such as mentioned above require zero order waveplates to be impractically thin, e.g., on the order of 25 μm, and are typically better suited for making higher order waveplates.

U.S. Pat. Nos. 5,375,012 and 5,627,676 teach that a birefringent glass can be produced by applying stress to a phase-separated glass at an elevated temperature. A phase-separated glass is a glass which, upon heat treatment, separates into at least two phases: a separated phase in the form of particles, either amorphous or crystalline, dispersed in a matrix phase. The applied stress elongates the particles and generates a form birefringence in the glass. U.S. Pat. No. 5,375,012 discloses that the phase-separated glass could be selected from a glass containing silver halide particles, PbO—$B_2O_3$ glasses (and borosilicate glasses with high $B_2O_3$ contents) that tend to exhibit a secondary borate phase, and bivalent metal (lead, calcium, barium and strontium) oxide, silicate and borosilicate glasses. U.S. Pat. No. 5,627,676 discloses a phase-separated glass having crystalline particles selected from the group consisting of copper chloride, copper bromide, and mixtures thereof dispersed in a $R_2O$—$Al_2O_3$—$B_2O_3$—$SiO_2$ glass matrix. U.S. Pat. No. 5,627,676 reports that the degree of form birefringence obtainable in a glass containing copper bromide and/or chloride particles is substantially greater than that obtained in a silver halide glass.

The ability to obtain form birefringence in a stretched phase-separated glass is not unusual especially when the phase separation is liquid—liquid in nature. The down side is that invariably, the index ratio of the separated phase to the matrix phase is small, resulting in a correspondingly small birefringence. In the phase-separated glass containing silver halide particles, the index ratio of the separated phase to the matrix phase is not the problem, but the amount of silver halide phase that can be produced is limited, which ultimately limits the magnitude of form birefringence that can be achieved. It is possible to increase the amount of silver halide phase by using a glass composition with a higher silver content; however, this approach seems to have reached its limit with the result of a half wave at 1500 nm in 1.6 mm thickness. Therefore, in one extreme situation simple liquid—liquid phase separation can attain high volume fractions of the separated phases but with small index contrast. In the other extreme situation, liquid—liquid phase separation has high index contrast but limited amount of the separated phase.

From the foregoing, what is desired is a glass composition that can produce liquid—liquid phase separation with high volume fraction of the separated phase and high index contrast between the separated phase and the matrix phase.

SUMMARY OF THE INVENTION

In one aspect, the invention relates to a birefringent glass composed of a phase-separated glass. The phase-separated glass comprises a borosilicate glass in which fluorine and a constituent that tends to crystallize into a high refractive index phase as a consequence of phase separation are included. In one embodiment, the constituent that tends to crystallize into a high refractive index phase comprises $TiO_2$.

Other features and advantages of the invention will be apparent from the following description and the appended claims.

DETAILED DESCRIPTION

Figure 1:
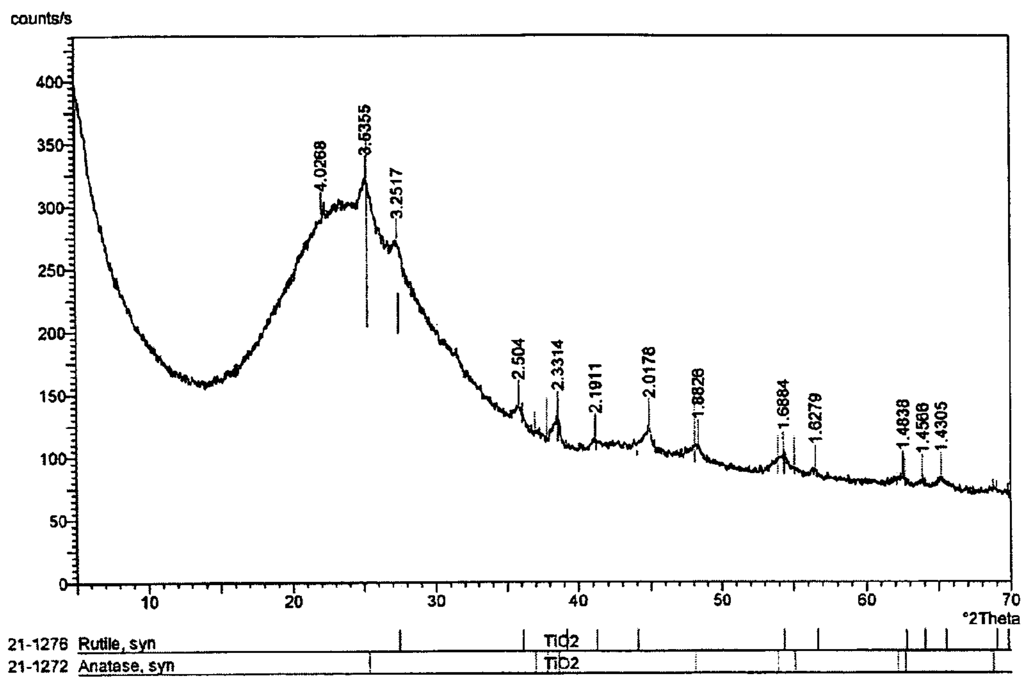
FIG. 1 is an x-ray diffraction pattern of a phase-separated glass according to an embodiment of the invention showing evidence of $TiO_2$ crystal phases anatase and rutile.

The invention will now be described in detail with reference to a few preferred embodiments, as illustrated in accompanying drawings. In the following description, numerous specific details are set forth in order to provide a thorough understanding of the invention. However, it will be apparent to one skilled in the art that the invention may be practiced without some or all of these specific details. In other instances, well-known features and/or process steps have not been described in detail in order to not unnecessarily obscure the invention. The features and advantages of the invention may be better understood with reference to the drawings and discussions that follow.

Embodiments of the invention provide a phase-separated glass that has a high volume fraction of the separated phase and a high index contrast between the separated phase and the matrix phase. The phase-separated glass may be subjected to stress to render it birefringent. The invention is based in part on the discovery that addition of fluorine to borosilicate glass, e.g., in an amount greater than 4% by weight, produces a significant liquid—liquid phase separation. The invention is also based in part on the discovery that a glass having a constituent that tends to crystallize into a high refractive index phase as a consequence of phase separation may be rendered birefringent by applying stress to elongate the crystals. In one embodiment, this constituent is $TiO_2$. In a borosilicate glass containing fluorine and $TiO_2$, phase separation into a fluoride-rich phase destabilizes the dissolved $TiO_2$, leading to its subsequent crystallization after a thermal treatment.

Quite surprisingly, form birefringence on the order of 0.01 at 546 nm has been measured in a stretched phase-separated glass containing $TiO_2$ crystals. For some perspective of the order of magnitude, this is equivalent to the birefringence of crystalline quartz. The present discovery has two significant effects. One effect is that the thickness of a waveplate for a given degree of birefringence can be reduced. For example, a half waveplate having a thickness of 0.2 mm at 1500 nm is possible with the present invention. This is a significant improvement over the 1.6 mm thickness required in the augmented silver halide case discussed in the background of the invention. This reduction in waveplate thickness is important where miniaturization and compactness are essential. The other effect is that for a waveplate of given thickness, the degree of birefringence can be increased, for example, to meet requirements for telecommunication applications.

A phase-separated glass according to an embodiment of the invention can be obtained from a glass batch containing $R_2O$—$Al_2O_3$—$B_2O_3$—$SiO_2$, where $R_2O$ represents alkali metal oxides. The glass batch also includes a source of fluorine. Preferably, fluorine is present in an amount greater than 4% by weight. The glass batch also includes a constituent that tends to crystallize into a high refractive index phase as a consequence of phase separation. In a preferred embodiment, this constituent is $TiO_2$. Preferably, $TiO_2$ is present in an amount of 2% by weight or greater. The glass batch may optionally include components such as $NaNO_3$, $ZrO_2$, CuO, and Ag. Table 1 below shows preferred compositional ranges for the glass batch. The actual batch ingredients may include any materials, either the oxides or other compounds, which when melted in combination with the other components will be converted into the desired oxide in the proper proportions.

TABLE 1

| Component | Range (wt %) |
|---|---|
| $SiO_2$ | 50–65 |
| $B_2O_3$ | 15–20 |
| $Al_2O_3$ | 5–16 |
| $Li_2O + Na_2O + K_2O$ | 9–14 |
| $NaNO_3$ | 0–3 |
| $ZrO_2$ | 0–5 |
| CuO | 0.0–0.1 |
| Ag | 0.1–0.5 |

TABLE 1-continued

| Component | Range (wt %) |
|---|---|
| $TiO_2$ | 1–6 |
| F | 1–7 |

Phase-separated glasses having the compositions shown in Table 2 were made by melting the appropriate glass batches and shaping the melt into glass bodies. Compositions 1~8 contain $TiO_2$ whereas compositions A and B do not. As will be discussed later, compositions A and B are included in Table 1 to illustrate the effect of $TiO_2$ on the degree of birefringence. The glass bodies were thermally treated to induce phase separation. Typically, the glasses were heated to a temperature above the strain point of the glass, typically in a range from 550 to 600° C. For the glasses containing $TiO_2$, the dissolved $TiO_2$ in the glass crystallized after the thermal treatment. The phase-separated glasses were stretched to induce form birefringence. Table 2 reports the measured birefringence of the phase-separated glasses after stretching. Large birefringences are reported for the compositions 1~8 containing $TiO_2$.

TABLE 2

| Comp. | $SiO_2$ | $B_2O_3$ | $Li_2O$ | $Na_2O$ | $K_2O$ | $NaNO_3$ | $Al_2O_3$ |
|---|---|---|---|---|---|---|---|
| 1 | 61.5 | 18.2 | 1.8 | 3.1 | 5.6 | 1 | 6.2 |
| 2 | 56.5 | 18.2 | 1.8 | 3.1 | 5.6 | 1 | 6.2 |
| 3 | 60.5 | 18.2 | 2 | 4.1 | 5.6 | 0 | 6.2 |
| 4 | 58.5 | 18.2 | 2 | 4.1 | 5.6 | 0 | 6.2 |
| 5 | 56.5 | 18.2 | 1.8 | 3.1 | 5.6 | 1 | 6.2 |
| 6 | 60.5 | 18.2 | 2 | 3.1 | 5.6 | 1 | 6.2 |
| 7 | 56.5 | 18.2 | 1.8 | 3.1 | 5.6 | 1 | 6.2 |
| 8 | 56.5 | 18.2 | 1.8 | 3.1 | 5.6 | 1 | 6.2 |
| A | 63.5 | 18.2 | 1.8 | 3.1 | 5.6 | 1 | 6.2 |
| B | 63.5 | 18.2 | 1.8 | 3.1 | 5.6 | 1 | 6.2 |

| Comp. | $ZrO_2$ | $TiO_2$ | CuO | F— | Ag | Birefringence nm/cm |
|---|---|---|---|---|---|---|
| 1 | 0 | 2 | 0.006 | 5 | 0.25 | 16,950 |
| 2 | 5 | 2 | 0.006 | 7 | 0.25 | 20,180 center |
| | | | | | | 64,570 edge |
| 3 | 0 | 3 | 0 | 5 | 0 | 109,680 center |
| | | | | | | 125,550 edge |
| 4 | 0 | 5 | 0 | 5 | 0 | 106,000 |
| 5 | 5 | 2 | 0.006 | 5 | 0.25 | 100,000 |
| | | | | | | 132,000 edge |
| 6 | 0 | 3 | | 5 | 0.25 | 109,000 center |
| 7 | 5 | 2 | 0.006 | 4 | 0.25 | 67,650 |
| 8 | 5 | 2 | 0.006 | 4 | 0.25 | 74,850 |
| A | 0 | 0 | 0.006 | 2 | 0.25 | 660 |
| B | 0 | 0 | 0.006 | 4 | 0.25 | None |

The glass compositions containing $TiO_2$ result in a stretched phase-separated glass having large birefringences. Table 2 reports birefringences on the order of 100,000 nm/cm (or 0.01) where $TiO_2$ content is 2% by weight or greater. There is no noticeable difference in the birefringences reported for glass compositions 3 and 6, where composition 3 differs from composition 6 in that it does not contain silver. This suggests that silver does not play a role in producing the large birefringence observed in the stretched phase-separated glass. Similarly, $ZrO_2$ does not appear to play a role in producing the large birefringence observed since it can be removed without any observed effect on birefringence (see, for example, compositions 3 and 6).

FIG. 1 shows an x-ray diffraction of a phase-separated glass having composition 5 (see Table 2) after stretching. The x-ray diffraction shows that the $TiO_2$ crystal phase, both anatase and rutile, are present in the glass after stretching. Although, there is no direct evidence of the shape of the $TiO_2$ crystals after stretching, there is strong evidence that the $TiO_2$ crystal phase plays a significant role in the large birefringence value observed in the stretched glass. For example, when the glass is made without $TiO_2$, see compositions A and B in Table 2, and then thermally treated to induce phase separation and then stretched, there is little or no observed birefringence in the stretched glass. With respect to $TiO_2$ content, a comparison of compositions 4, 5, and 6 in Table 2 shows that there is an increase in birefringence up to 3% by weight $TiO_2$, but not with higher concentration.

The mechanism by which $TiO_2$ phase forms in an elongated fashion, which is required to explain the birefringence, is not known. However, there is sufficient amount of the $TiO_2$ phase present, as indicated by the intensity of the x-ray peaks in FIG. 1, together with the high refractive index of $TiO_2$ to produce the value observed. Rutile is a birefringent crystal with an ordinary refractive index of 2.6 and an extraordinary value of 2.9. The equation for the form birefringence is:

$$\Delta n = \frac{V_f(\varepsilon - 1)}{4n}\left[\frac{1}{L_1(\varepsilon - 1) + 2} - \frac{1}{L_2(\varepsilon - 1) + 2}\right] \tag{3}$$

where $V_f$ is the volume fraction of the elongated phase whose refractive index is $n^2=\epsilon$. Assuming a long particle and $\epsilon=7.29$ and $V_f=0.016$ based on the weight percent of $TiO_2$, then the above equation yields an estimate for the birefringence of 0.013, which is consistent with the measured values of the order of 0.01 (100,000 nm/cm).

Figure 2:
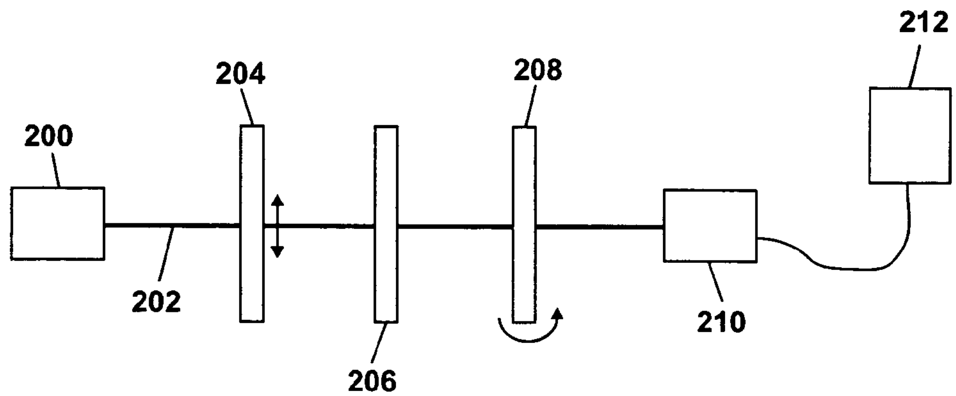
FIG. 2 is a schematic illustration of a testing system for measuring phase shift.

FIG. 2 shows a standard measurement setup for phase shift. The measurement setup includes a light source 200, such as a laser source, generating a light beam 202. The light beam 202 passes through a fixed polarizer 204, a birefringent glass 206, and a rotating polarizer 208 and is detected and analyzed by a power head 210 and power meter 212. The light beam 202 is linearly polarized as it passes through the fixed polarizer 204. In one study, the birefringent glass 206 is a sample of stretched phase-separated glass produced from composition 5 (see Table 2) and the light beam 202 is a collimated beam having a wavelength of 1550 nm. The birefringent glass 206 is oriented at 45° with respect to the fixed polarizer 204 so that the light emerging from the birefringent glass 206 is circularly polarized. The expression for the transmittance is as follows:

$$T = \frac{1}{2}(1 - \cos\theta\cos\delta) \tag{4}$$

where $\theta$ is the angle between the fixed polarizer and rotating polarizer and $\delta$ is the phase shift produced by the birefringence. Phase shift is related to birefringence by the following:

$$\delta = \frac{360}{\lambda} L\Delta n \tag{5}$$

where $\lambda$ is wavelength, L is sample thickness, and $\Delta n$ is form birefringence.

Figure 3:
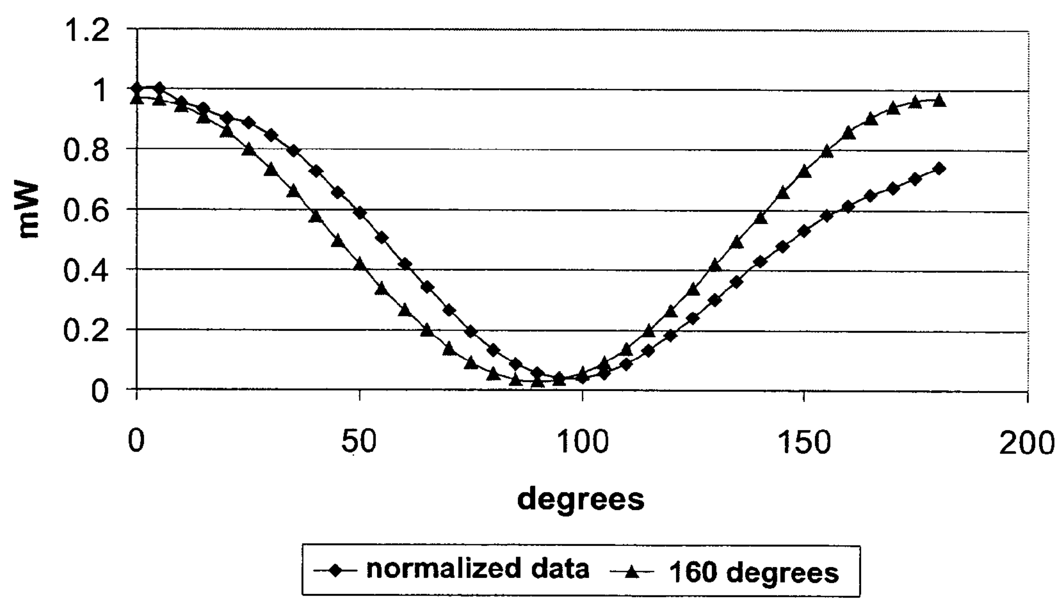
FIG. 3 is a plot of phase shift of a phase-separated glass having form birefringence of 0.0033 at 1520 nm.

FIG. 3 is a plot showing transmittance as a function of the angle between the fixed polarizer 204 and the rotating polarizer 208. The plot shown in FIG. 3 is the measured transmittance and the fit to the data of $\delta=160°$. The plot indicates that a phase shift of 180° would require a thickness of 0.2 mm. This is a significant reduction from the 1.6 mm thickness required with the augmented silver-halide glass discussed in the background of the invention. This phase shift translates to a birefringence of 0.0033 at 1500 nm, compare to 0.01 at 560 nm.

The stretched phase-separated glass containing the $TiO_2$ crystal phase according to embodiments of the invention is useful in waveplate applications. The large degree of birefringence achievable in this glass permits production of a zero order waveplate in an integral body having a practical thickness in both the visible and infrared wavelength ranges. The thickness is not only practical but also reduced in comparison to, for example, the silver-halide case discussed in the background of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A birefringent glass composed of a phase-separated glass, the phase-separated glass comprising:

a borosilicate glass comprising fluorine and a high refractive index phase as a consequence of phase separation, said high refractive index phase comprising crystallized $TiO_2$.

2. The birefringent glass of claim 1, wherein $TiO_2$ is present in the borosilicate glass in an amount of approximately 2% by weight or greater.

3. The birefringent glass of claim 1, wherein the fluorine is present in the borosilicate glass in an amount of approximately 4% by weight or greater.

4. The birefringent glass of claim 1 having a birefringence on the order of 0.01 at 546 nm.

5. The birefringent glass of claim 1 having a birefringence on the order of 0.0033 at 1500 nm.

6. The birefringent glass of claim 1 comprising 50–65 wt % $SiO_2$, 15–20 wt % $B_2O_3$, 5–16 wt % $Al_2O_3$, 9–14 wt % $Li_2O+Na_2O+K_2O$, 0–3 wt % $NaNO_3$, 0–5 wt % $ZrO_2$, 0.0–0.1 wt % CuO, 0.1–0.5 wt % Ag, 1–6 wt % $TiO_2$, and 1–7 wt % F.

7. The birefringent glass of claim 6 comprising 56–62 wt % $SiO_2$, 15–20 wt % $B_2O_3$, 10–16 wt % $Al_2O_3$, 9–14 wt % $Li_2O+Na_2O+K_2O$, 0–3 wt % $NaNO_3$, 0–5 wt % $ZrO_2$, 0.0–0.1 wt % CuO, 0.1–0.5 wt % Ag, 2–6 wt % $TiO_2$, and 4–7 wt % F.

8. The birefringent glass of claim 6 having a birefringence on the order of 0.01 at 546 nm.

9. The birefringent glass of claim 6 having a birefringence on the order of 0.0033 at 1500 nm.

* * * * *